Patented Feb. 9, 1943

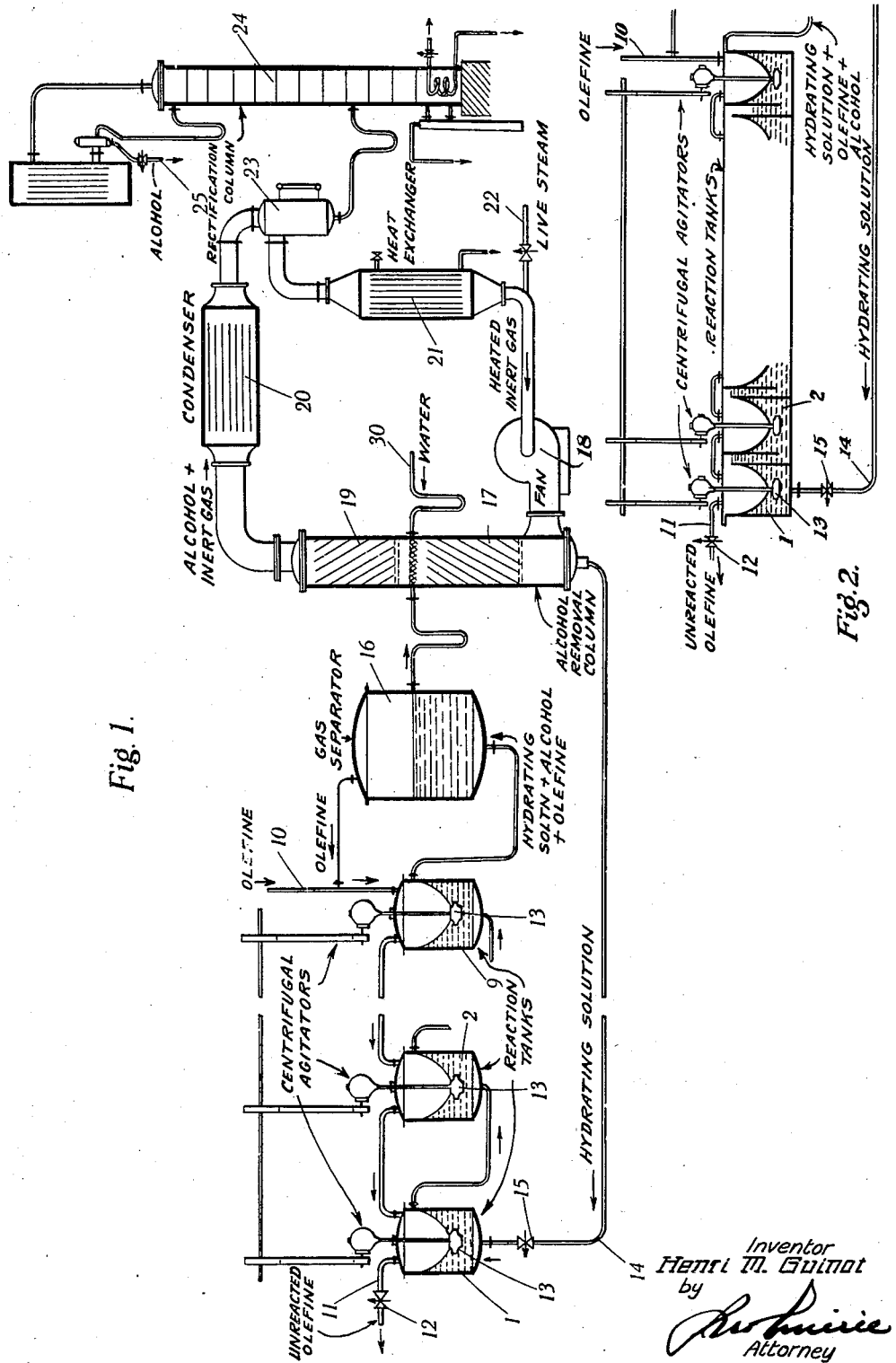

2,310,911

UNITED STATES PATENT OFFICE 2,310,911

HYDRATION OF OLEFINS

Henri Martin Guinot, Niort, Deux-Sevres, France; vested in the Alien Property Custodian Application November 15, 1938, Serial No. 240,593
In France November 17, 1937

6 Claims. (Cl. 260—641)

This invention relates to the hydration of olefins.

It is known that olefins can be converted directly into the corresponding alcohols by causing them to be absorbed in hydrating solutions, which usually comprise warm aqueous solutions of sulphuric acid. In particular, Wibaut & Dieckmann (Koninjlijke Akedemie Van Wetenschappen T. C. Amsterdam 24, March 1923, vol. 26, p. 321) have demonstrated the possibility of preparing ethyl alcohol by passing ethylene through a small tower through which flows an aqueous solution of sulphuric acid having a concentration of 65% $H_2SO_4$, at a temperature of 150 to 160°. Upon leaving the tower, the unabsorbed ethylene carries a small amount of alcohol and water vapour. After cooling the gas, a condensate is obtained containing 21 grams of alcohol for each five liters of ethylene treated.

The authors, emphasising the extreme slowness of the reaction, conclude that it is not interesting from the practical point of view. However, due to economic importance of the manufacture of alcohols from olefins, numerous efforts have been made to render the Wibaut & Dieckmann reaction commercially feasible.

It has been proposed to achieve this result by working at high pressures and also by using a much more concentrated sulphuric acid than that above mentioned. Neither of these expedients have proved commercially successful because, firstly, high pressure operations involve considerable expense for pumping and heavy capital outlay for expensive apparatus capable of withstanding the high pressures, and secondly, a highly concentrated sulphuric acid gives rise to the classic reaction of Berthelot which does not give direction conversion of olefins into alcohols but forms alkyl sulphates which must be subsequently hydrolized. Furthermore the use of a highly concentrated acid gives rise to undesirable secondary reactions and as a result the sulphuric acid rapidly becomes unsuitable for reuse and has to be discarded, thus seriously increasing production costs.

It has also been found that it is necessary to remove the alcohol produced from the hydrating agent as soon as possible to avoid its accumulation in the re-agent which, if allowed to occur, leads to undesirable secondary reactions and to deterioration of the reagent rendering it unfit for re-use. The rapid removal of the alcohol also permits the hydrating agent to conserve its maximum reactivity. This removal is conveniently effected by regulating the feed of the hydrating solution in such a manner that the proportion of alcohol present in the hydrating liquid does not generally exceed 5%, above which proportion secondary reactions appear, and which furthermore varies slightly depending upon the degree of reactivity of the hydrating solutions used and upon the nature of the olefins treated.

Thus the process of hydrating olefins directly into alcohols according to the present invention comprises dispersing an olefin or an olefin-containing gaseous mixture in a warm acid solution, the concentration of which is below that giving rise to secondary reactions, by effecting a number of successive fine dispersions of the olefin or olefin-containing gas in the hydrating solution, in which the olefin or olefin-containing gas moves in countercurrent with respect to the hydrating solution through a number of tanks provided with high speed rotary stirrers, maintaining the concentration of alcohols in the hydrating agent below 5% and removing the alcohol from the hydrating agent as soon as it leaves the reaction vessel. By proceeding in this manner the hydrating solution gradually increases its olefinic (and alcohol) content, and the gas gradually decreases in olefinic content.

The present process is based upon the discovery that the Wibaut and Dieckmann reaction referred to above can be carried out without unduly high pressures or acid concentrations if a very large contact surface is provided between the hydrating solution and the olefin or olefin-containing gas, such as is obtained when the gas is finely dispersed in the acid solution.

Thus the process of hydrating olefins directly into alcohols according to the present invention comprises dispersing an olefin or an olefin-containing gaseous mixture in a warm acid hydrating solution, the concentration of which is below that giving rise to secondary reactions. The reaction may be carried out at atmospheric pressure, although the yield of alcohol is sometimes increased by working at slightly higher pressures; when used, these higher pressures are only of the order of a few atmospheres and do not require costly reinforced high pressure apparatus.

The process of the present invention therefore avoids the disadvantages indicated above, namely, the use of costly high-pressure apparatus, and the deterioration of hydrating agent, and renders the Wibaut and Dieckmann reaction commercially workable with the only extra production costs, as far as the actual hydrating operation is concerned, as are represented by the expense of emulsifiers and power for their operation. The prevention of deterioration of the hydrating agent is of particular importance since it permits the process according to the present invention to be conducted as a continuous process, using the same hydrating agent for repeated treatment of successive amounts of olefin. This avoidance of secondary reactions and re-use of the same hydrating agent by means of the present invention is remarkable when it is considered how very easily these secondary reactions occur with the consequent deterioration of the hydrating agent.

It is preferred to carry out the process of the present invention in a series of successive dispersions in which the olefin or olefin-containing gas moves in counter-current with respect to the hydrating solution through a series of tanks provided with centrifugal agitators. By this means the hydrating solution gradually increases its olefinic (and alcohol) content as the gas correspondingly decreases in olefinic content.

High speed rotary stirrers are preferably used to produce the fine dispersion and this has the advantage that the pressure differences which they establish in each tank can be used to produce flow from one tank to the next, if each tank is provided with a pipe leading from near its top (high pressure liquid) to near the base of its successor (low pressure liquid).

It has been found that when sufficiently large surface contact between olefin and hydrating agent is provided, as in the process of the present invention, the speed of olefin conversion is proportional to the partial pressure of olefin in the gaseous mixture treated.

Starting from this law of action, the number of tanks to be put into operation, their respective capacities and finally the rate of flow of hydrating liquor to be circulated, can be determined by a very simple mathematical calculation if the following factors are known:

a. Percentage of olefin in the gas to be treated,
b. Rate of flow of the gas to be treated,
c. Solubility of the olefin in the hydrating solution when pure and at atmospheric pressure.
d. Degree of extraction of olefin which it is desired to attain.

The removal of the alcohol from the hydrating liquor can be effected in a practical manner without dilution of the reagent or a preliminary hydrolysis, by passing the hydrating solution from the battery, after removing the gas therefrom, into a column where a warm inert gas circulates in counter-current. It is preferable this gas flow at high speed during its passage through the column; after it is saturated with alcoholic vapours in contact with the hydrating liquor, it is passed through a refrigerant which causes cooling and condensation of the major part of the alcoholic vapours. Thereafter the gas can be recovered, heated, and "conditioned" by a supply of live steam and returned in a closed circuit to the base of the alcohol-removing column for continuous use. After its passage through the alcohol-removing column, the hydrating solution may be returned to the battery of tanks and utilised again for dissolving and hydrating olefin contained in the gas treated, after a suitable quantity of water to compensate for the quantity combined with the olefin, as well as the quantity lost in the course of the alcohol removal (i. e. sufficient to re-establish the initial concentration of the hydrating solution) has been added. It is advantageous to effect this addition of water at the top of the alcohol removing column.

The volume of the alcohol removing column and the circulation speed of the warm inert gas are chosen in such a manner that almost all the alcohol is removed by distillation during the passage of the hydrating liquor in the column. The removal of alcohol being thus effected without attaining the boiling point of the hydrating liquor, the action is very gentle and no secondary reactions are produced.

With regard to the hydrating liquor to be used, although aqueous solutions of sulphuric nature having a concentration of 50 to 85% of $H_2SO_4$ are suitable according to the present invention, the concentration being determined by the reaction temperature chosen and the olefin to be hydrated, it is however preferable to use sulphuric liquors having sulphates or bisulphates in solution. In the process according to the present invention, the main advantage of using such hydrating liquors arises from the fact that this permits a more rapid elimination of alcohol when blowing the inert gas into the hot solution. Furthermore, it has been found that aqueous sulphuric solutions charged with salts act in a more gentle manner upon olefins liable to polymerisation or tending to give rise to secondary reactions. By proceeding as indicated above it has been found that substantially all the alcohol formed remains in the hydrating solution, and that only traces are carried in vapour form in the exhausted olefinic gas or gases, so that in practice there is generally no need to treat these gases to recover alcohol. However if it is desired to effect such recovery it may be easily done by passing the gases leaving the apparatus through a washing tower containing cold water.

In order to facilitate an understanding of the invention, certain examples thereof will be given purely by way of illustration and will be described in connection with the accompanying drawing in which:

Fig. 1 is a general diagram of the apparatus.
Fig. 2 shows modification of the tank battery shown in Fig. 1.

*Example 1.*—A gas containing 40% of propylene and 60% of propane is to be converted to isopropanol.

Referring to Fig. 1, the gas, at atmospheric pressure, is passed into a battery of nine tanks 1, 2–9, each having a useful capacity of 500 litres, at a rate of 50 cu. metres per hour. The gas is led by the pipe 10 into the tank 9 and then circulates from tank to tank and leaves by the pipe 11 which is controlled by a regulating valve 12. Each tank is provided with a high speed rotary stirrer 13, constructed in such a manner as to permit fine dispersion of the gas in the liquid within the tank.

At the left extremity of the battery, a sulphuric acid solution having a concentration of 60% $H_2SO_4$ heated to 100° C. is passed into the tank 1 by the pipe 14 which is controlled by the valve 15, at a rate of 1100 litres per hour. One kilo of this solution is capable of dissolving 16 litres per hour of propylene if it is violently agitated in an atmosphere of pure propylene at ordinary pressure. As in the present case, the concentration in propylene of the gas circulating in the battery is equal to or less than 40%, the action of the hydrating liquor is proportionally reduced but it remains however sufficient to dissolve a total of 18.5 cu. metres of propylene in the battery per hour.

The pipe 11 permits withdrawal of 31.5 cu. metres of gas which do not contain more than 5% of propylene.

The sulphuric acid circulating by overflow from the tanks owing to the aspiration of each of the stirrers leaves the tank 9 charged with approximately 3% of isopropanol. After the removal of gas from the tank 16, it is passed into an alcohol removal column 17 in which it circulates in counter-current with hot hydrogen for removal of the alcohol.

The hydrogen is circulated in the tower 17 by a fan 18 in a closed circuit. Placed in intimate contact with the liquid in the column, the temperature of which is maintained at 100°, the gas becomes laden with alcoholic vapours. A precipitator 19 allows the droplets of hydrating solution which may have been mechanically entrained by the gaseous current, to be retained and the gas is then passed into a condenser 20 where the alcoholic vapours condense. After passing through a re-heater 21 and after having been mixed with live steam from the pipe 22 to avoid too great an evaporation of water in the alcohol removal column 17, the inert gas thus "conditioned" is returned to the column 17 to be recirculated.

The condensate received from the base of the condenser 20 in an intermediate receptacle 23 is passed to the central part of a rectification column 24, at the top of which concentrated isopropanol is withdrawn through pipe 25 at a rate of 62 litres per hour, calculated as pure alcohol.

The hydrating solution discharged from the base of the alcohol removal column 17 contains less than 0.5% of alcohol. Its sulphuric acid concentration, if necessary, is adjusted either by adding boiling water from the base of the rectification column 24 or by increasing the rate of flow and heat content of the inert gas in circulation with consequent dehydration of the acid solution. The heating of the reagent to the temperature desired is accomplished by coils placed in the tanks composing the battery, and in the gas removal tank 16 and, if desired, in the column 17. Thus the thermal content and concentration of the hydrating solution is maintained uniform and it can be reused because there is no appreciable formation of secondary reaction products and, in particular, no production of sulphur dioxide thus indicating that the sulphuric acid does not act as an oxidation agent, contrary to its behavior often in other processes. A pipe 30 is used for addition of water to the tower 17 needed to recondition the hydrating solution.

*Example 2.*—According to this example, instead of using isolated tanks as in Example 1, tanks welded together or formed by appropriate partitioning of a trough, are used, which facilitates their construction (see Fig. 2).

In this instance, isopropyl alcohol is to be produced from propylene contained in a propane-propylene mixture, having 20% of olefin, circulated at a rate of 100 cu. meters per hour, with 5% of unused propylene in the gas discharge.

The operations are conducted under a pressure of 10 kilos per cm.$^2$, using sulphuric acid (65%) at a temperature of 50° C. For this purpose a battery of 5 tanks are used each containing 500 kilos of hydrating solution. There are thus formed 37 kilos of isopropanol per hour, the circulation of the acid in the battery being regulated so that when discharged the acid has an alcohol concentration of 3%.

*Example 3.*—A gaseous mixture containing 75% of ethylene and 25% of ethane is to be treated. The operations are to be conducted under a pressure of 25 kg. per cm.$^2$, using at 130° C., a hydrating bath containing:

One part by weight of 80% sulphuric acid.
One part by weight of potassium bisulphate.

The rate of solution of ethylene in such a mixture is 40 cu. metres per hour per ton of bath.

The hydration battery comprises 7 tanks, each containing 800 kilos of hydrating solution which is circulated at a rate of 4950 kilos per hour. The removal of ethyl alcohol is effected with ethane and provides a distillate of 13° Gay-Lussac at the rate of 150 kilos per hour of alcohol.

Without the use of potassium bisulphate in the hydrating bath, the concentration of the distillate is only 6–7° Gay-Lussac.

It will be noted that in the foregoing examples working pressures of atmospheric pressure, 10 kg./cm.$^2$ and 25 kg./cm.$^2$ are disclosed, however it is to be noted that pressures of twenty to twenty-five kilos per cm.$^2$ should not be exceeded as otherwise special costly high pressure apparatus would be required.

It will be appreciated that certain modifications in the apparatus described may be made within the scope of the invention by using for the battery, units having progressively decreasing capacity.

Similiarly there may be used several groups of tanks (separate or coupled as in Fig. 2), the mixture, the hydrating liquid and the olefin occurring either in each group or between the various groups. That is to say the groups may be arranged to receive olefinic gas from a single source and hydrating agent from a single source, the countercurrent passage through each group being the same as described in the single group illustrated in Figs. 1 and 2. Alternatively the corresponding individual tanks of each group may by connected for countercurrent flow between each other although not so connected with the other tanks of the same group. In this last instance there will be in effect, as many conversion units as there are tanks in each group. Another alternative is to connect all the groups "in series."

Furthermore the removal of alcohol can be effected by injecting superheated steam at the base of the alcohol removal column instead of using a hot inert gas. In this instance a slight dilution of the acid in the hydrating agent is produced which accordingly must be concentrated for example in a tank similar to those which have been indicated for the hydration of the olefins before reuse. When so used the high speed rotary stirrer functions to finely disperse the warm hydrating solution and the inert gas blown in at a suitable rate through the liquid, causing removal of the water necessary to restore the initial concentration of the hydrating solution.

The inert gas used as the carrier fluid for the alcohol should possess proper heat exchange properties and also be preferably only slightly water soluble and consequently only slightly soluble in the hydrating liquors used. Hydrogen is particularly desirable, although nitrogen, methane, or the inert gases which accompany the olefin to be hydrated can be used, either alone or mixed.

The hydrating solutions used in practicing the present invention may be modified by adding thereto certain organic sulphonic acids such as benzene sulphonic acid, which is correctly recognized as an excellent hydration reagent, as well as certain catalysts such as salts of silver, copper or mercury.

It is also within the scope of the invention to effect heat recoveries between different parts of the apparatus. Thus the heat content of the vapours leaving the alcohol column 17 may be utilised for example in the preliminary heating of the gas blown by the fan, or for the heating of the rectification column 24.

We claim:

1. A continuous process of hydrating olefins directly into alcohols comprising essentially effecting a plurality of successive fine dispersions of the gaseous olefin in an acid hydrating solution, the concentration of which is below that giving rise to secondary reaction, said successive fine dispersions taking place in a plurality of successive interconnected receptacles, said hydrating solution passing in one direction through said plurality of receptacles in counter-current to said solution, maintaining the concentration of alcohol in said hydrating solution always below 5% by controlling the rate of addition of olefin and rate of removal of reaction products, and removing the alcohol from said hydrating solution immediately after effecting the last of said fine dispersions.

2. A continuous process of hydrating olefins directly into alcohols as claimed in claim 1 in which said hydrating solution contains a substance selected from the group consisting of the soluble alkali metal sulphates and bisulphates.

3. A continuous process of hydrating olefins directly into alcohols as claimed in claim 1 in which said hydrating solution contains benzene sulfonic acid.

4. A continuous process of hydrating olefins directly into alcohols as claimed in claim 1 in which said hydrating solution contains a metal salt catalyst selected from the group consisting of copper, silver and mercury salts.

5. A continuous method of hydrating olefins to give alcohols directly which comprises flowing an acid hydrating solution, the concentration of which is below that giving rise to the secondary reactions, through a plurality of successive receptacles, flowing gaseous olefin in counter-current to said hydrating solution through the same receptacles, producing fine dispersion of the olefin gas in the liquid in each of said receptacles, controlling the rate of flow of said hydrating solution so that the concentration of alcohol in said hydrating solution is never more than 5%, passing the hydrating solution containing the alcohol formed, after the last dispersion, to a tower where a hot inert gas is blown through it, cooling said inert gas as it leaves said tower to condense said alcohol, and removing this latter for further treatment, reheating and adding steam to said inert gas for further use whereby it provides water to replace that lost from said hydrating solution in the formation of alcohol, returning said hydrating solution from said tower back to the first of said dispersion receptacles and effecting heat interchanges between said gas after it leaves said tower and the hydrating solution before it reenters the tower to recondition said hydrating solution.

6. A continuous method of hydrating olefins to give alcohols directly which comprises flowing an acid hydrating solution, the concentration of which is below that giving rise to the secondary reactions, through a plurality of successive receptacles, flowing gaseous olefin in counter-current to said hydrating solution through the same receptacles, producing fine dispersion of the olefin gas in the liquid in each of said receptacles, controlling the rate of flow of said hydrating solution so that the concentration of alcohol in said hydrating solution is never more than 5%, passing the hydrating solution containing the alcohol formed, after the last dispersion, to a tower where a hot inert gas is blown through it, cooling said inert gas as it leaves said tower to condense said alcohol, and removing this latter for further treatment, reheating and adding steam to said inert gas for further use whereby it provides water to replace that lost from said hydrating solution in the formation of alcohol, returning said hydrating solution from said tower back to the first of said dispersion receptacles, effecting heat interchanges between said gas after it leaves said tower and said hydrating solution before it reenters said tower to recondition said hydrating solution, and between said gas after it leaves said tower and other quantities of said gas before it enters said tower to precondition said gas, and supplying water to said tower for further reconditioning of said hydrating solution.

HENRI MARTIN GUINOT.

CERTIFICATE OF CORRECTION.

Patent No. 2,310,911.                                           February 9, 1943.

HENRI MARTIN GUINOT.

It is hereby certified that error appears in the printed specification of the above numbered patent requiring correction as follows: Page 4, first column, line 24, claim 1, after the word "receptacles" insert --and said olefin gas passing through said plurality of receptacles--; and that the said Letters Patent should be read with this correction therein that the same may conform to the record of the case in the Patent Office.

Signed and sealed this 27th day of November, A. D. 1945.

Leslie Frazer (Seal)                              First Assistant Commissioner of Patents.